United States Patent [19]

Gavin

[11] Patent Number: 5,666,768
[45] Date of Patent: Sep. 16, 1997

[54] COLLAPSIBLE HANDLE ASSEMBLY FOR CONCRETE COVERS

[76] Inventor: Norman W. Gavin, 2545 Ridge Rd., North Haven, Conn. 06473

[21] Appl. No.: 581,286

[22] Filed: Dec. 29, 1995

Related U.S. Application Data

[63] Continuation-in-part of Ser. No. 392,357, Feb. 17, 1995, Pat. No. 5,592,785.

[51] Int. Cl.⁶ .............................. E02O 29/14; B25G 1/00
[52] U.S. Cl. .......................... 52/125.4; 16/112; 16/126; 52/21; 52/105; 52/124.2
[58] Field of Search ........................ 16/110.5, 112, 16/119, 125, 126, 127, DIG. 12, DIG. 18, DIG. 19, DIG. 41; 52/19, 20, 21, 125.1, 125.3, 125.4, 125.5, 125.6, 124.1, 124.2, 125.2, 139, 105

[56] References Cited

U.S. PATENT DOCUMENTS

| | | |
|---|---|---|
| 921,554 | 5/1909 | Millhouse . |
| 1,078,491 | 11/1913 | Field ........................................... 16/126 |
| 1,803,337 | 5/1931 | Lundquist ................................. 16/112 |
| 1,832,409 | 11/1931 | Mueller . |
| 1,832,611 | 11/1931 | Aufderheide . |
| 3,078,621 | 2/1963 | Hinds ...................................... 52/125.4 |
| 3,393,489 | 7/1968 | Oliver ........................................ 52/689 |
| 3,568,626 | 3/1971 | Southworth, Jr. ........................ 116/114 |
| 3,645,100 | 2/1972 | La Monica ..................................... 6/13 |
| 3,788,025 | 1/1974 | Holmes ..................................... 52/685 |
| 3,916,821 | 11/1975 | Pies ....................................... 116/114 R |
| 4,185,425 | 1/1980 | Merkel ..................................... 52/103 |
| 4,699,838 | 10/1987 | Gilbert ..................................... 428/201 |
| 4,905,725 | 3/1990 | Sinkinson et al. ........................ 137/370 |
| 5,155,954 | 10/1992 | Roire ...................................... 52/125.5 |
| 5,200,704 | 4/1993 | Clark, Jr. et al. ........................ 324/326 |
| 5,291,703 | 3/1994 | Ziegler ...................................... 52/103 |
| 5,390,766 | 2/1995 | Martin ................................ 16/DIG. 19 |

FOREIGN PATENT DOCUMENTS 213175  3/1924  United Kingdom .

*Primary Examiner*—Michael Safavi
*Attorney, Agent, or Firm*—Robert A. Seemann

[57] ABSTRACT

A housing designed to be anchored in concrete includes a handle and a pivot for moving the handle between an upstanding position and a generally recessed position with respect to the top of the housing. The pivot may extend from the housing for anchoring the housing in the concrete.

18 Claims, 6 Drawing Sheets

COLLAPSIBLE HANDLE ASSEMBLY FOR CONCRETE COVERS

This application is a continuation-in-part of U.S. application Ser. No. 08/392,357, filed Feb. 17, 1995 now U.S. Pat. No. 5,592,785.

BACKGROUND OF THE INVENTION

1. Field of the Invention

This invention pertains to a handle for concrete and other heavy covers that are buried below grade, such as covers and inspection lids for subterranean structures such as septic tanks, wells, and liquid distribution boxes, more specifically it pertains to a handle assembly in which the handle can be recessed into the concrete cover to protect the handle from earth moving equipment, and in which the handle can be raised above the cover for lifting the cover.

2. Description of the Prior Art

One often used way for making a handle for a concrete cover is cutting off a piece of rebar from rebar that is commonly used at the construction site, bending the piece of rebar into a U shape, and casting the bent rebar into the cover by inserting the legs of the U into the concrete before it hardens. Handles of this type may be seen in U.S. Pat. No. 3,645,100.

Another way is to insert a rigid, plastic U shaped handle by the legs of the U into the concrete before it hardens. The legs are shaped so that recesses in the legs receive the flowing concrete and thereby anchor the handle in the hardened concrete. Shoulders on the legs help to limit the depth of the legs in the concrete. An example of this handle is shown in FIG. 1.

These metal and plastic rigid, upstanding, handles can be caught by machinery digging down in the earth for access to the cover so that it can be removed to service the buried subterranean structure. This can damage the handle or cover.

SUMMARY OF THE INVENTION

It is one object of the invention to provide a handle assembly for a concrete cover.

It is another object that the handle assembly recesses the handle in the cover so that earth moving machinery cannot catch the handle.

It is another object that the handle assembly provides an upstanding handle for lifting the cover.

It is another object that operation of the handle assembly is not prevented by ice forming on the cover.

It is another object that the handle assembly provides means for sensing the location of the cover.

It is another object that the handle assembly includes construction site materials for constructing the assembly to save cost of manufacture, and shipping weight to the construction site.

Other objects and advantages will become apparent to the reader of the following description of the invention.

A collapsible handle assembly for concrete covers includes a housing, a handle having a top and a bottom, the bottom comprising a leg, pivot means connected to the housing, and the leg comprising bearing means for rotating the handle on the pivot means.

The housing further includes concrete anchor means on the housing shaped so that the housing is anchored by the concrete anchor means in concrete when the housing is cast in the concrete. In one embodiment of the invention the pivot means is also the concrete anchor means. The pivot means may also comprise rebar, and may be spaced on the housing from the top of the housing.

A metal marker of substantial mass, which may comprise rebar, is mounted on the handle for sensing the location of a concrete cover when the housing is cast in the concrete cover.

The housing includes a cavity having sufficient size for receiving the top of the handle generally recessed with respect to the top of the housing.

In another way of describing the invention, the collapsible handle assembly for concrete covers comprises a concrete cover, a handle, the concrete cover comprising a cavity having sufficient size for receiving the top of the handle generally recessed with respect to the top of the concrete cover.

Means holds the handle in the cavity so that the handle is movable from a first upstanding position with respect to the top of the cover to a second generally recessed position with respect to the top of the cover.

The means which holds the handle in the cavity may be pivot means for pivoting the handle between the first upstanding position and the generally recessed position. Also, the means which holds the handle in the cavity may be bar means, which may comprise rebar.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
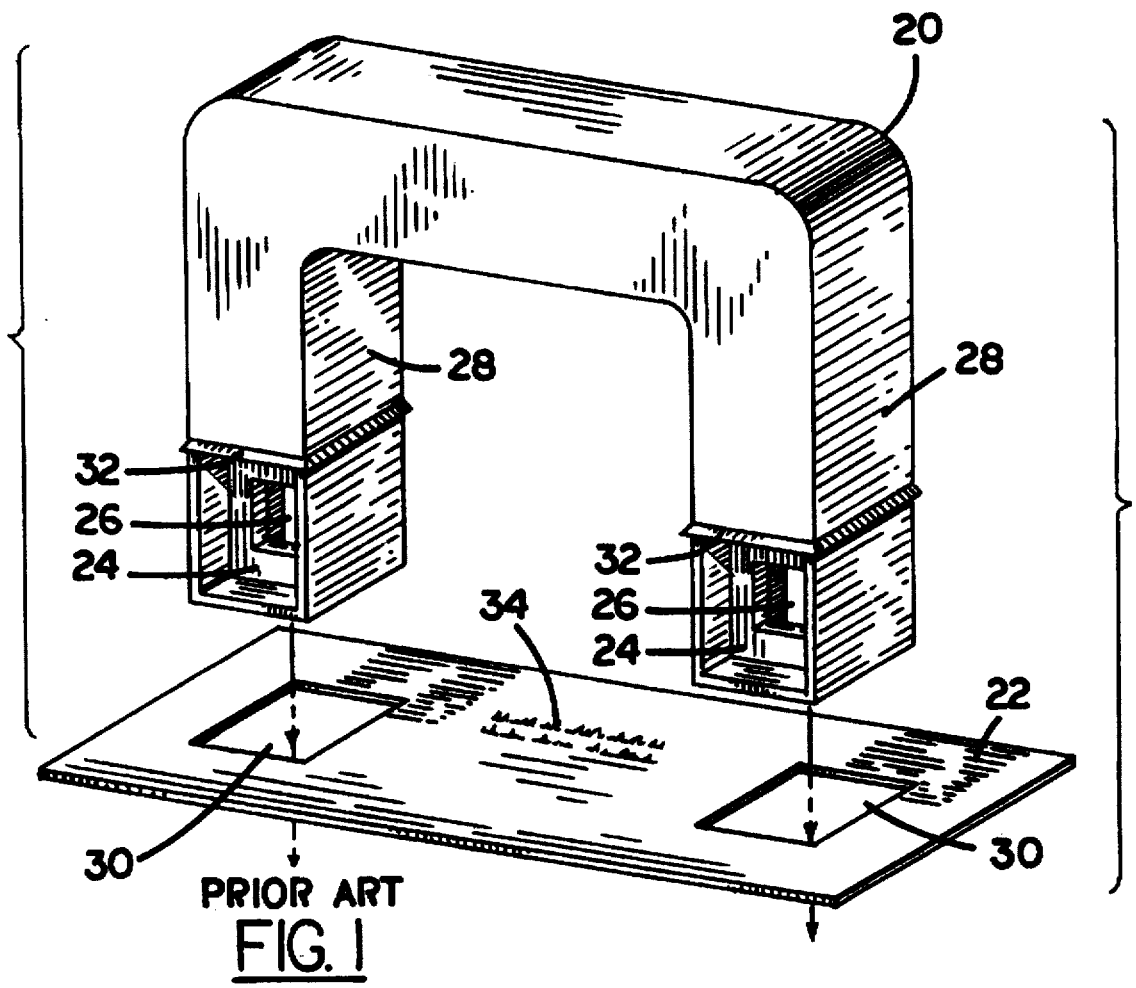
FIG. 1 is a perspective view of a Prior Art handle.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

In FIG. 1, Prior Art handle 20 is made of plastic, and includes recesses 24 in legs 28, and holes 26 through the legs for receiving liquid concrete when the handle is inserted in an upstanding attitude into the liquid concrete up to ridges 32. Upon hardening of the concrete, recesses 24 and holes 26 anchor handle 20 in the concrete.

Plastic wall 22 includes holes 30 through which legs 28 are inserted into the concrete. Wall 22, which may carry indicia of installation dates, cleanout dates and warnings for a septic tank, is held on the top of the cover by ridges 32 on wall 22.

Figure 2:
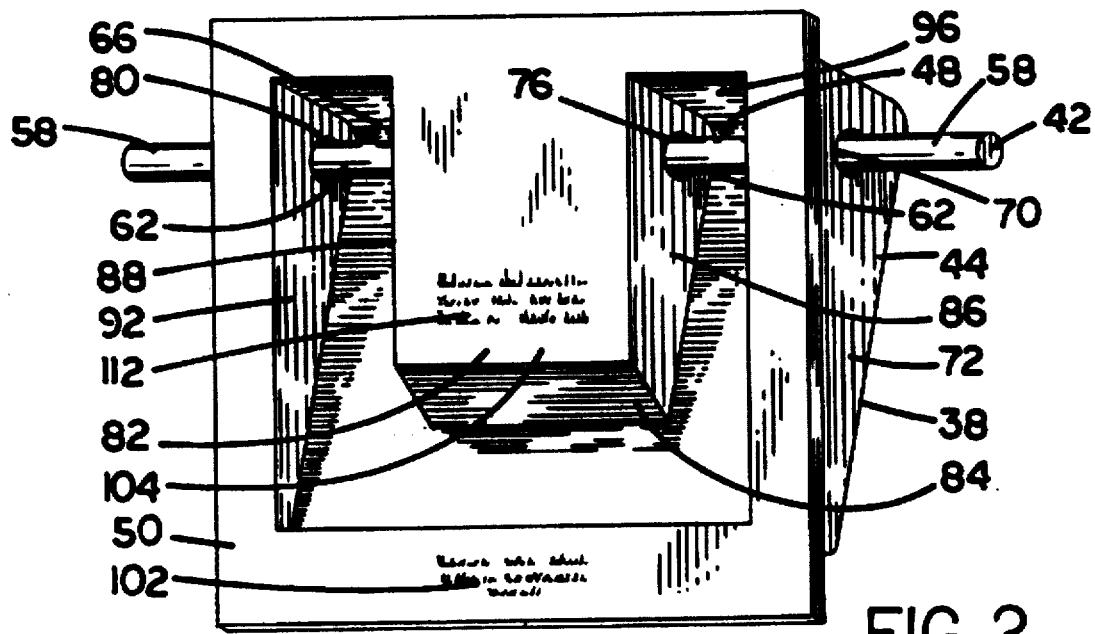
FIG. 2 is a top, right perspective view of a handle assembly of the invention without the handle.
Figure 3:
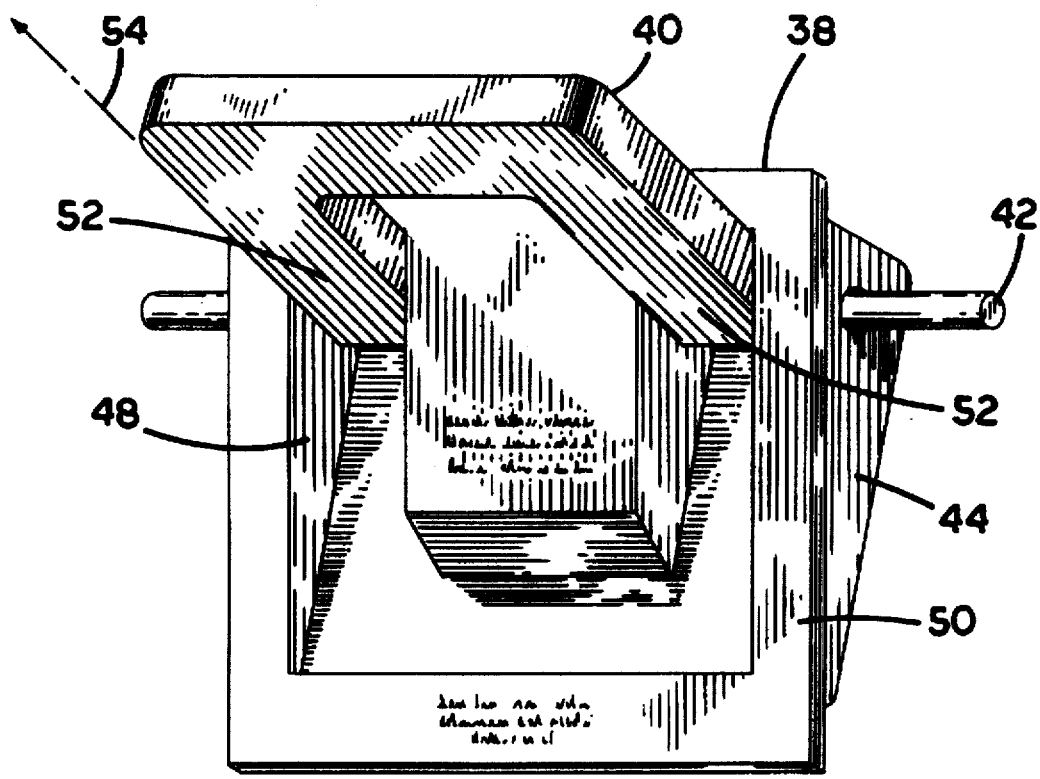
FIG. 3 is a top, right perspective view of a handle assembly of the invention with an upstanding handle.
Figure 4:
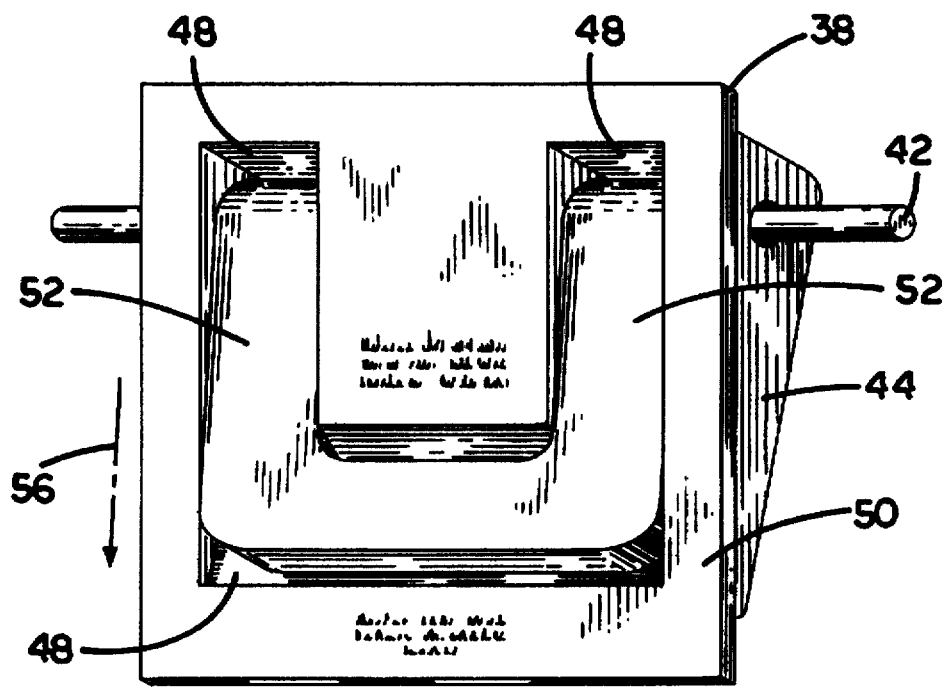
FIG. 4 is a top, right perspective view of the handle assembly of FIG. 3 with the handle in the recessed position.
Figure 5:
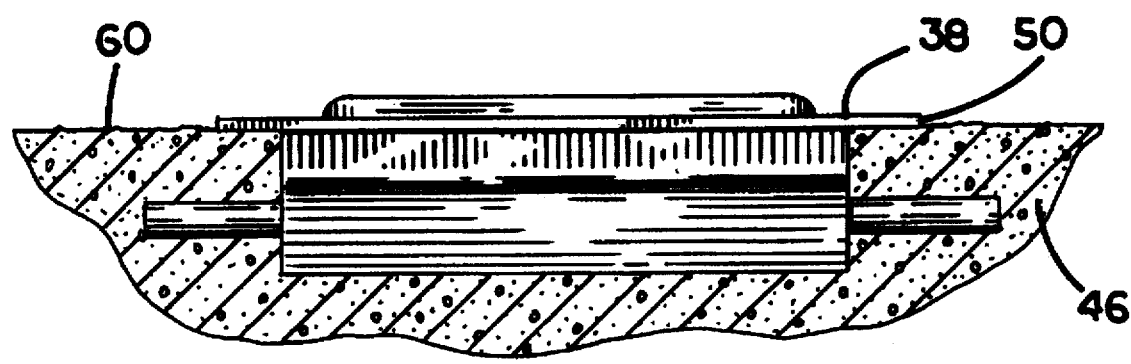
FIG. 5 is a front view of the handle assembly of FIG. 4, set into a concrete cover.
Figure 6:
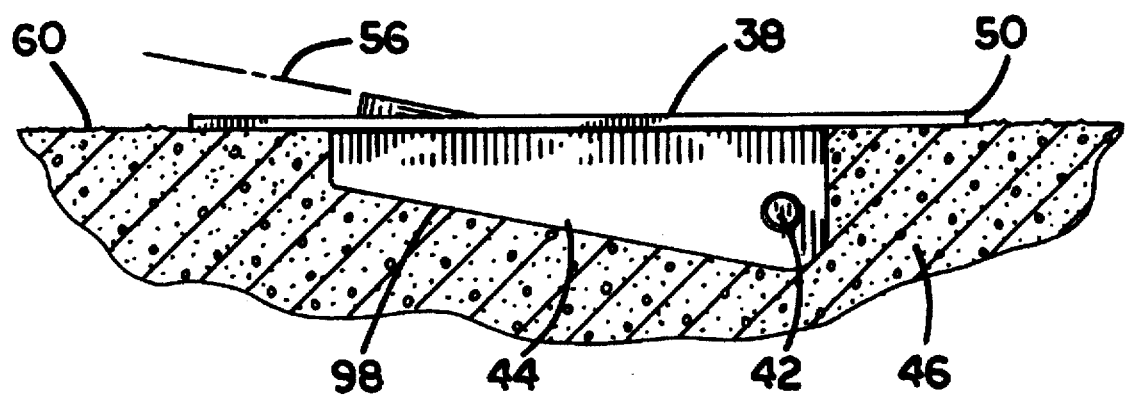
FIG. 6 is a right side view of the handle assembly of FIG. 5.
Figure 7:
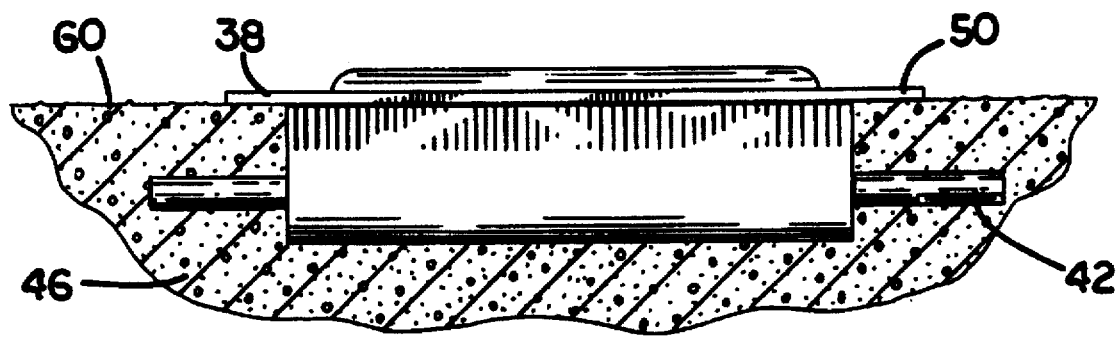
FIG. 7 is a rear view of the handle assembly of FIG. 5.
Figure 8:
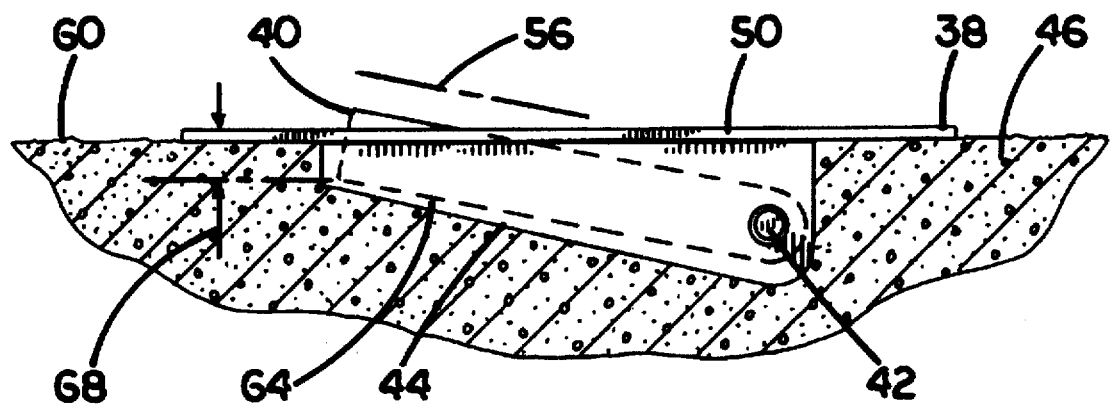
FIG. 8 is a right side view of the handle assembly of FIG. 5, showing the handle in hidden line.
Figure 9:
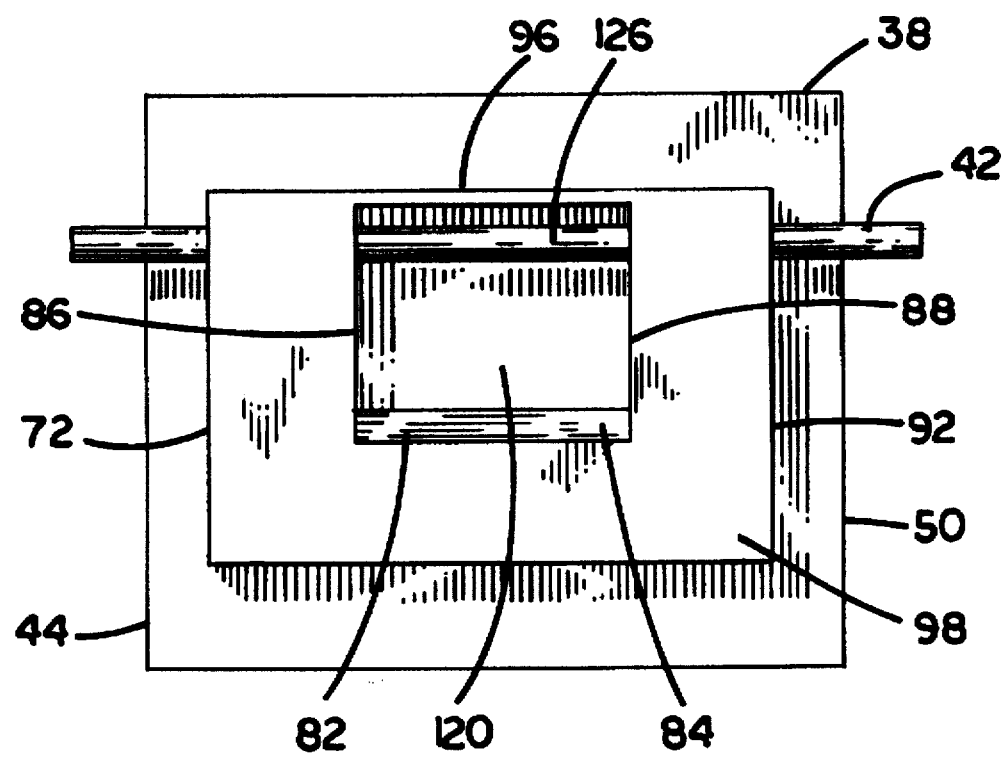
FIG. 9 is a bottom view of the handle assembly of FIG. 5.
Figure 10:
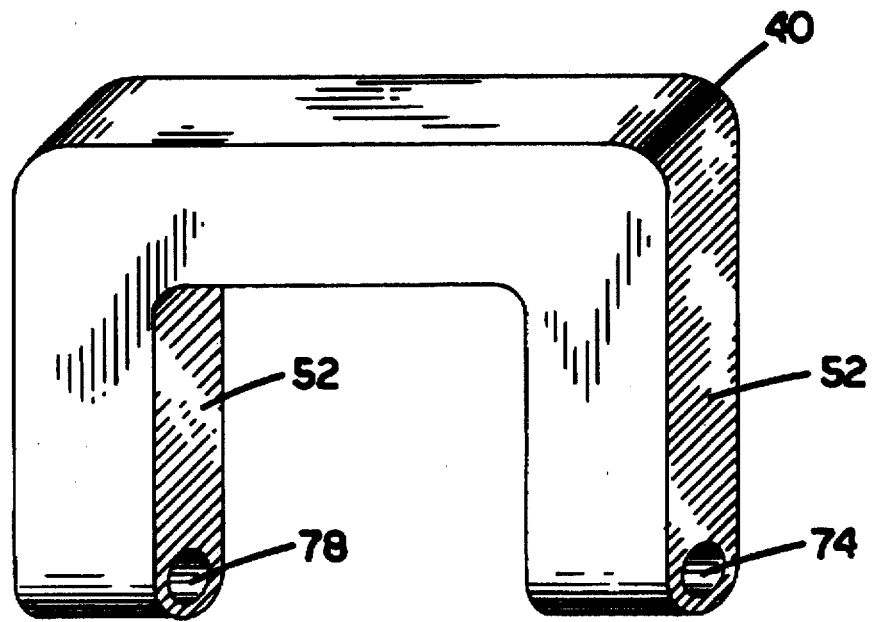
FIG. 10 is a perspective view of the handle of the handle assembly of FIG. 5.

Turning now to FIGS. 2, 3, 4, 5, 6, 7, 8, 9 and 10, of handle assembly 38 of the invention, FIG. 2 shows the assembly without handle 40, so that the pivot means may be more clearly shown.

Housing 44 is sealed sufficiently so that concrete 46 in the liquid state cannot fill cavity 48 enough by entering cavity 48 below frame 50 to prevent pivoting movement of handle 40 on pivot bar 42. Preferably this should allow handle 40 to pivot from a vertical position 54 shown in FIG. 3, to a recessed position 56 shown in FIGS. 4, 5, 6, 7, and 8. That is, from being generally normal to the frame to being generally level with the frame.

As shown in FIGS. 4, 5, 6, 7, and 8, the handle may tilt slightly upward with respect to frame 50 so long as it has one side 64 recessed 68 below the frame, and preferably below face 60 of concrete 46 of the cover. Face 60 is generally coplanar with frame 50. This reduces the profile by which earth moving equipment may catch the handle as the equipment moves over the cover.

Pivot bar 42 anchor section 58 which is outside of housing 44 anchors housing 44 in the concrete. Pivot bar 42 is also the pivot means for handle 40 at pivot section 62. Pivot bar 42 is preferably made from a piece of rebar. Rebar is readily available at a concrete construction site, as rebar is usually used to reinforce the concrete by casting of the rebar in the concrete wall of a concrete item.

Pivot bar 42 may also be made from pipe or rod.

Inside corners 66 of housing 44 are curved so that if water were to collect within housing cavity 48 and freeze about the handle, the handle can be rotated to an upstanding position, ice and all, as the ice slides around within the curved corner, operating simply as a temporary extension of handle legs 52. Housing 44 and handle 40 are preferably molded of engineered plastic such as Dupont (tm) 801. The handle is designed to be gripped by hand, but is strong enough to be engaged by cable or other lifting means, as the handle can be manufactured to a 2,000 pound rating.

Although plastic is preferred, corrosion resistant metal may be used for making one or both of the housing and handle.

Installing handle assembly 38 is easy. The handle is inserted, legs first, into the housing, and rebar is slid from one side of the housing, say the right side, through in succession, opening 70 in right side wall 72, handle bearing opening 74, pedestal 82 right side wall 86 opening 76, left side pedestal opening (not shown), handle bearing opening 78, and left side wall opening 80.

The housing is then pressed down into the liquid concrete to frame 50, and the concrete is allowed to harden with the assembly set in place in the concrete. A close fit between the left and right side wall openings and the rebar prevents the relatively thick liquid concrete mixture from filling housing cavity 48.

The handle assembly may also be installed by setting the housing with the frame facing down against the bottom of the concrete casting form. For this, the handle should be recessed about flush or below the frame so that the frame makes a close seal with the bottom of the concrete casting form. The concrete is added to the form, and when the form is removed from the hardened concrete, the handle assembly will be found set into the concrete flush with the face of the concrete.

Pedestal 82 provides additional rigidity, and in cooperation with bar 42 provides central anchoring stability for housing 44. Pedestal 82 also minimizes the amount of ice loading of handle 40 within housing cavity 48 by occupying the volume between the handle legs and top of the handle.

Pedestal right side wall 86, left side wall 88, wall 84, and housing right side wall 72, left side wall 92, and back wall 96 each extend into the cover and are between the concrete and the handle when the handle assembly is cast in the cover. Each is attached to frame 50 which carries indicia 102 and are attached to top panel 104 of the pedestal which carries indicia 112. Wall 98 is connected to frame 50 which carries the indicia.

The inside 120 of pedestal 82 fills with concrete when the handle assembly is installed in the cover. This provides additional anchoring in the concrete by way of section 126 of bar 42.

Figure 11:
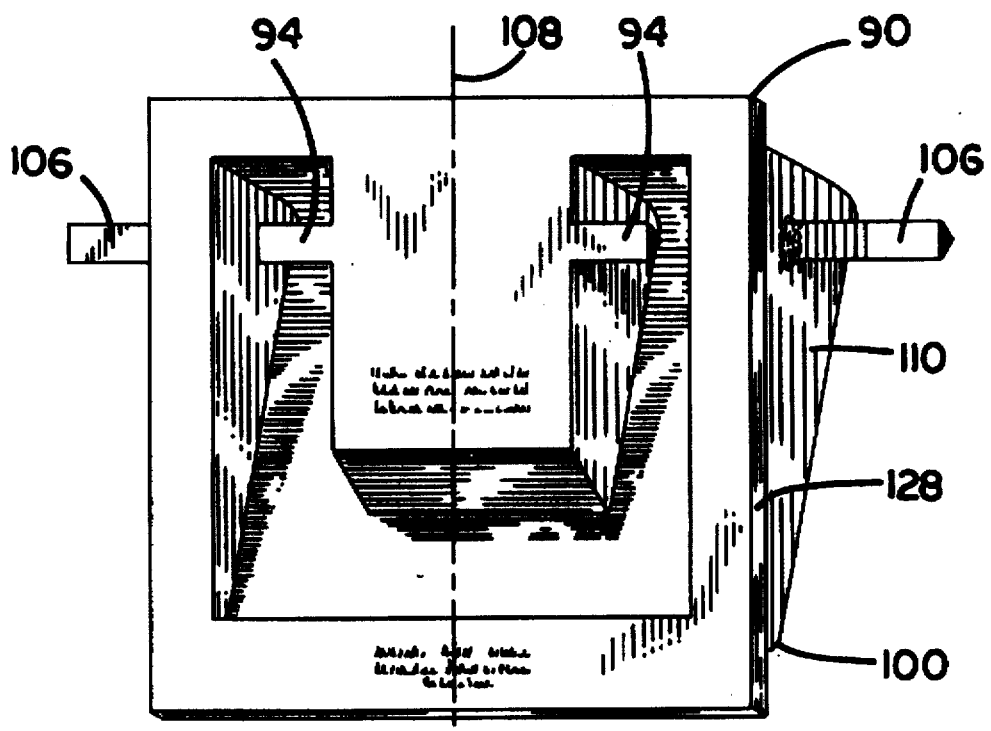
FIG. 11 is a right side view of another handle assembly without the handle.
Figure 12:
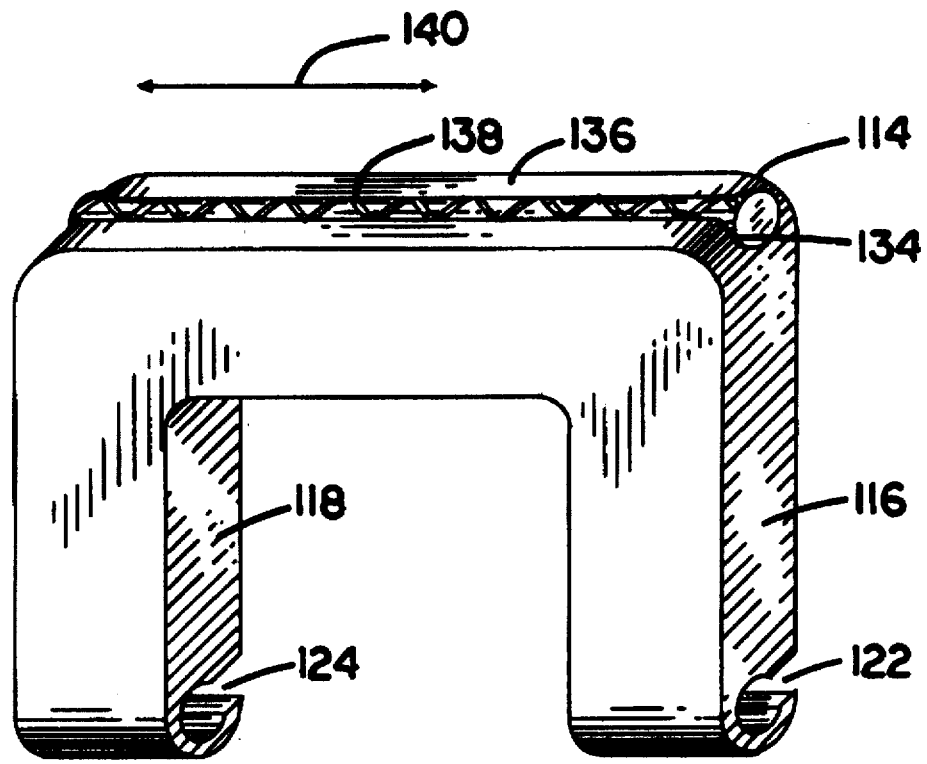
FIG. 12 is a perspective view of a handle of the invention which provides means for sensing the location of the cover.
Figure 13:
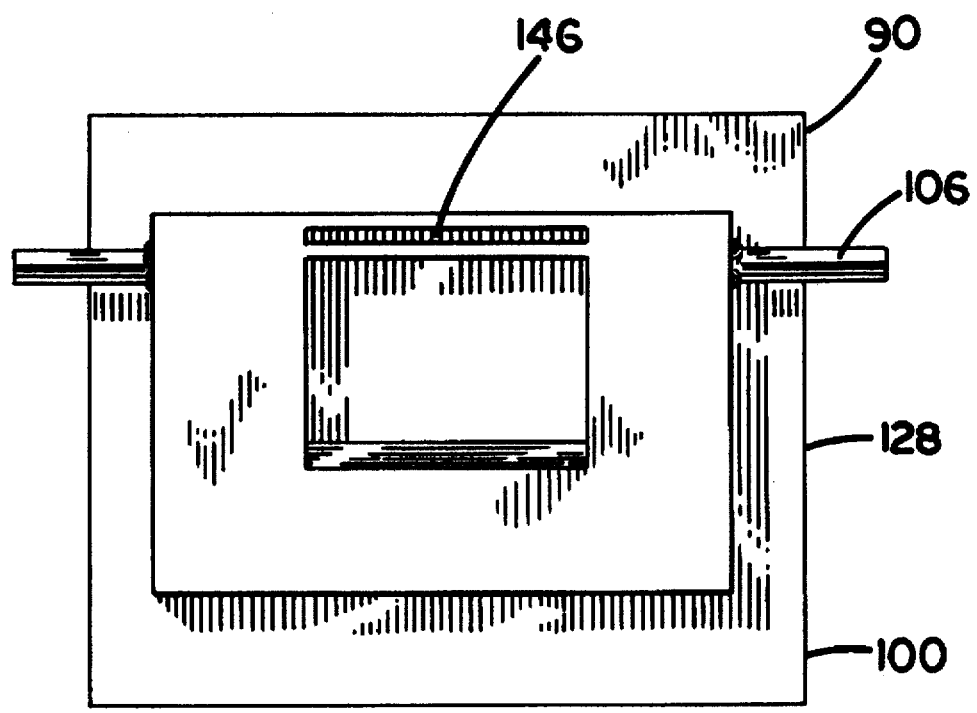
FIG. 13 is a bottom view of the handle assembly of FIG. 11.

Referring to FIGS. 11, 12 and 13 of handle assembly 90, pivots 94 are molded in housing 100. They extend laterally within the housing with respect to center line 108 of the housing. Concrete anchoring for housing 100 is provided by bars 106 which are molded on right side wall 110, and on the left side wall of housing 100.

Handle 114 is installed in housing 100 by hooking legs 116 and 118 on the pivots by way of hook slots 122 and 124 respectively with the handle held at about 100 degrees vertical with respect to frame 128. The handle is then rotated forward into recess in the housing where the handle is about zero degrees or parallel with respect to the frame.

Often after below ground installation of the concrete element of construction and cover, a lawn or other valuable overlying surface is developed. When it is time to inspect, clean or otherwise access the interior of the element of construction, it is desirous to find the exact location of the cover and dig straight down so as to disturb as little of the overlying development as possible.

Handle 114 provides a mark of the location of the concrete cover in which plastic housing 100 and plastic handle 114 is installed, through use of a metal detector. Many metal detector designs which can detect fully assembled handle 114 below ground are presently available on the market, such as from Radio Shack (tm), a division of Tandy Corp., Fort Worth, Tex.

Handle 114 includes slot 134 in top 136 of the handle, for receiving a metal bar. In a preferred embodiment of the invention, slot 134 is shaped to receive rebar 138 that is commonly used in construction. Preferably slot 134 is shaped to receive the rebar by insertion of the rebar from one end of the slot axially into the slot, and to prevent withdrawal of the rebar radially from the slot. A portion of the top therefor extends over each side of the rebar.

Portions of rebar often abound as scrap on construction sites. Cutting tools for quickly cutting the rebar are also commonly available on construction sites. A portion of rebar is cut preferably to about the length 140 of slot 134, and is inserted into slot 134 at the construction site.

The handle with rebar provides a high quality marker for detection equipment because the rebar presents to the metal detector a substantially large ferrous mass that is easy to detect for most detectors.

The handle can be economically molded without the cost in dies and labor of molding-in a remotely detectable marker of the quality of rebar.

Handle 114 may also be used with housing 44 if desired.

In handle assembly 38, each of handle 40 and housing 44 comprises a remotely detectable metal marker of substantial mass in pivot bar 42, so that the concrete cover can be found by sensing pivot bar 42, even when the cover is buried many inches below ground.

In handle assembly 90, if bar 106 for anchoring housing 100 in concrete is not metal, and rebar 138 is not used in handle 114, a metal marker of substantial mass, that is, enough mass to be detected when the cover is buried, can be provided on housing 90 by, for example, passing rebar through the housing outside the movement area of the handle, or by installing a wide bar or plate of metal in slot 146.

It should be understood that the term "concrete" is to be considered in the broad sense to include equivalent and similar construction materials which can be made to harden about the handle assembly.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A collapsible handle assembly for a concrete item, said assembly comprising in combination:

a housing having a top, a left side wall, a right side wall, and a bottom panel attached to said left side wall and said right side wall, said housing being in the shape of a container having an opening at said top and configured to exclude concrete from the container when said housing is cast in concrete, a handle having a top, a bottom, and a pair of legs, each leg having a first end and a second end, the first ends of the legs being connected to the top of the handle, the second ends of the legs forming the bottom of the handle, first pivot means in said container connected to said housing, said first leg comprising first bearing means at the bottom of the handle for rotating said handle on said first pivot means, second pivot means in said container connected to said housing, said second leg comprising second bearing means at the bottom of the handle for rotating said handle on said second pivot means, a pedestal mounted in said housing between said first and second legs in said container and having a first opening configured to deliver concrete into said pedestal between said legs when said housing is cast in concrete, said housing comprising concrete anchor means mounted on said housing and configured so that said housing is anchored by said concrete anchor means in concrete when said housing is cast in concrete.

2. The assembly of claim 1 wherein:

said first pivot means is a bar comprising said concrete anchor means.

3. The assembly of claim 1, further comprising:
   said pivot means comprising rebar.

4. The assembly of claim 1, further comprising:
   said handle comprising a marker of substantial mass for sensing the location of a concrete item when said housing is cast in the concrete item.

5. The assembly of claim 4, further comprising:
   said marker comprising rebar.

6. The assembly of claim 1, wherein:
   said container is of sufficient size to receive the top of said handle generally recessed with respect to the top of said housing.

7. The assembly of claim 1, further comprising:
   said housing comprising a marker of substantial mass for sensing the location of a concrete item when said housing is cast in the concrete item.

8. The handle assembly of claim 1, wherein said first pivot means comprises a bar which extends from said container into said pedestal whereby said bar is surrounded by concrete in said pedestal when said housing is cast in concrete, said anchor means comprising said bar.

9. The handle assembly of claim 1, wherein said first and second pivot means comprise a bar extending through said first bearing means and through said pedestal and through said second bearing means, whereby said bar is surrounded by concrete in said pedestal between said legs when said housing is cast in concrete, said anchor means comprising said bar.

10. The handle assembly of claim 1, wherein said first opening in said pedestal is through said bottom panel.

11. The handle assembly of claim 8, wherein said first opening in said pedestal is through said bottom panel.

12. The handle assembly of claim 8 wherein said bar extends through one of said right and left side walls whereby said anchor means comprises a portion of said bar outside of said housing.

13. The handle assembly of claim 11 wherein said bar extends through one of said right and left side walls whereby said anchor means comprises a portion of said bar outside of said housing.

14. A collapsible handle assembly comprising in combination:

an item comprising concrete, a housing having a top, cast in the concrete and being in the shape of a container having an opening at said top and excluding said concrete from said container, a handle having a top, a bottom, and a pair of legs, each leg having a first end and a second end, the first ends of the legs being connected to the top of the handle, the second ends of the legs forming the bottom of the handle, a pedestal mounted in said housing between said first leg and said second leg in said container and containing a portion of said concrete between the legs, means holding said handle in said housing so that said top of said handle is movable from a first position with respect to the top of said housing, to a second position with respect to the top of said housing.

15. The handle assembly of claim 14 wherein said means holding said handle comprises a rod extending through said second end of said first leg and into said pedestal and into said concrete in said pedestal.

16. The handle assembly of claim 14 wherein said means holding said handle comprises a rod extending through said second end of said first leg and through said pedestal including through said concrete in said pedestal and through the second end of the second leg.

17. The handle assembly of claim 15, wherein said rod also extends through a side of said housing and into the concrete surrounding said housing.

18. The handle assembly of claim 14, further comprising:
   said pedestal having a top panel, and
   indicia on said top panel.

* * * * *